United States Patent
Chew et al.

(10) Patent No.: US 11,897,519 B2
(45) Date of Patent: Feb. 13, 2024

(54) HYBRID DRIVE BY WIRE SYSTEM FOR TRACK VEHICLE OPERATION

(71) Applicant: ST ENGINEERING LAND SYSTEMS LTD, Singapore (SG)

(72) Inventors: Tze Meng Jensen Chew, Singapore (SG); Fu-Jun Timmy Low, Singapore (SG)

(73) Assignee: ST ENGINEERING LAND SYSTEMS LTD., Singapore (SG)

( * ) Notice: Subject to any disclaimer, the term of this patent is extended or adjusted under 35 U.S.C. 154(b) by 766 days.

(21) Appl. No.: 16/976,587

(22) PCT Filed: Mar. 2, 2018

(86) PCT No.: PCT/SG2018/050099
§ 371 (c)(1),
(2) Date: Aug. 28, 2020

(87) PCT Pub. No.: WO2019/168465
PCT Pub. Date: Sep. 6, 2019

(65) Prior Publication Data
US 2020/0406924 A1    Dec. 31, 2020

(51) Int. Cl.
*B60W 60/00* (2020.01)
*B60R 16/023* (2006.01)
(Continued)

(52) U.S. Cl.
CPC ......... *B60W 60/005* (2020.02); *B60R 16/023* (2013.01); *B60W 10/10* (2013.01);
(Continued)

(58) Field of Classification Search
None
See application file for complete search history.

(56) References Cited

U.S. PATENT DOCUMENTS

| 5,952,730 A | 9/1999 | Haller |
| 9,580,080 B1 | 2/2017 | Letwin |

(Continued)

FOREIGN PATENT DOCUMENTS

| CN | 107672597 A | 2/2018 |
| GB | 2267953 A1 | 12/1993 |

(Continued)

OTHER PUBLICATIONS

European Search Report for corresponding application EP 18 90 7885; dated Mar. 2, 2021.
(Continued)

*Primary Examiner* — James J Lee
*Assistant Examiner* — David Hatch
(74) *Attorney, Agent, or Firm* — CANTOR COLBURN LLP

(57) ABSTRACT

A system and method for utilizing multiple driver stations in a track vehicle is described. A primary driver station can utilize controls with hybrid drive by wire (DbW) functionality (i.e. hydro-mechanical and electric control). A secondary driver station and a tertiary driver station can utilize controls with DbW (i.e. electronic) control systems. The secondary and tertiary driver stations can be adapted for autonomous driving. The invention also includes a method of transfer between driver stations with safeguards for safety and reliability.

28 Claims, 14 Drawing Sheets

(51) Int. Cl.
  *B60W 10/10* (2012.01)
  *B60W 10/18* (2012.01)
  *B60W 10/20* (2006.01)
  *B62D 5/00* (2006.01)

(52) U.S. Cl.
  CPC ............ *B60W 10/18* (2013.01); *B60W 10/20* (2013.01); *B62D 5/001* (2013.01); *B60W 2510/20* (2013.01)

(56) References Cited

U.S. PATENT DOCUMENTS

| | | | |
|---|---|---|---|
| 2007/0198145 A1* | 8/2007 | Norris | B62D 1/286 |
| | | | 701/23 |
| 2011/0071718 A1 | 3/2011 | Norris | |
| 2014/0303827 A1* | 10/2014 | Dolgov | B60W 60/0053 |
| | | | 701/23 |
| 2017/0166221 A1 | 6/2017 | Osterman | |
| 2017/0322552 A1 | 11/2017 | Hilnbrand | |
| 2018/0284759 A1* | 10/2018 | Michalakis | B60W 50/082 |
| 2019/0092389 A1* | 3/2019 | McGill | B60T 8/17 |
| 2019/0295417 A1* | 9/2019 | Hiramatsu | B60W 50/10 |

FOREIGN PATENT DOCUMENTS

| | | |
|---|---|---|
| JP | 2014182453 A | 9/2014 |
| WO | 02061515 A2 | 8/2002 |
| WO | 2016201552 A1 | 12/2016 |

OTHER PUBLICATIONS

International Preliminary Report of Patentability for corresponding application PCT/SG2018/050099 filed Mar. 2, 2018; dated Nov. 9, 2018.

International search Report for corresponding application PCT/SG2018/050099 filed Mar. 2, 2018; dated Apr. 27, 2018.

Written Opinion of the International Searching Authority for corresponding application PCT/SG2018/050099 filed Mar. 2, 2018; dated Apr. 27, 2018.

* cited by examiner

HYBRID DRIVE BY WIRE SYSTEM FOR TRACK VEHICLE OPERATION

TECHNICAL FIELD

The present invention relates to a system and method for utilizing multiple driver stations in a track vehicle, and more specifically, to a hybrid drive by wire system with improved safety and operational capabilities for using multiple driver stations in a track vehicle.

BACKGROUND

An autonomous vehicle is one that is capable of monitoring its environment and navigating without human input. Benefits of autonomous vehicles include improved safety, improved efficiency, lower costs, decreased congestion and greater mobility for those who are unfit or not licensed to drive. Because a driver is not present to move mechanical linkages, autonomous vehicles operate through drive by wire technology.

Drive by wire ("DbW") technology is the use of electrical or electromechanical systems for performing vehicle functions that are conventionally achieved by mechanical linkages. This technology replaces the mechanical control systems with electronic control systems using electromechanical actuators and human-machine interfaces that use pedals and levers. It is similar to the fly-by-wire systems used widely in the aviation industry.

DbW technology can also be used in vehicles with more than one driver station. Multiple driver stations can be beneficial in industrial and military vehicles. A second driver can take over control of the vehicle if the primary driver is incapacitated or otherwise unable to continue driving. For example, a vehicle can include a primary driver station and a secondary driver station. The primary driver station can control the vehicle through conventional means (i.e. mechanical control systems). The secondary driver station can operate through DbW technology utilizing electronic control systems.

The operation of systems that utilize multiple driver stations requires safeguards for reliability and safety. The failure of any component could lead to a catastrophic accident. Similarly, any delay in transfer of control of a vehicle could be dangerous. For these reasons, conventional designs require that a vehicle come to a complete stop before commencing a transition between driver stations. However, this can be impractical for military vehicles. Recent designs have focused on improving the system of transferring control among driver stations.

U.S. Pat. No. 5,637,927 describes a device for switching control of vehicle accessories between vehicle control stations. When a control switch is activated, a gating means connect the control inputs of the corresponding control station to the output connector and disconnects all other control stations. However, the invention has shortcomings. The system requires that each station utilize only electrical controls. Further, the system lacks safeguards necessary for safety and reliability.

U.S. patent application Ser. No. 15,257,740 describes a drive by wire system with mechanical control for redundancy. In the event of an electrical failure, the mechanical steering can assume operation of the vehicle. However, the method of transition from mechanical to electrical control (and vice versa) lack safeguards to ensure safety and reliability. Further, the system does not apply to throttle control, braking or transmission control to a redundant system.

Accordingly, there is a need for an improved system that uses DbW technology for operating multiple driver stations in a vehicle. The system should overcome the limitations of conventional designs. It should allow transition among driving stations while the vehicle is moving with safeguards for improved reliability and safety.

SUMMARY OF THE INVENTION

There is a need for an improved system that uses DbW technology for multiple driver stations in a track vehicle such as a tank. Embodiments of the invention include a "DbW system" with multiple driver stations. Each of the primary driver station, secondary driver station and tertiary driver station can be used to operate mobility functions of the vehicle. Embodiments of the invention also include a method of transitioning between the driver stations while a vehicle is moving. Safeguards ensure reliability and prevent the possibility of a loss of control of the vehicle.

The following summary is provided to facilitate an understanding of some of the innovative features unique to the disclosed embodiments and is not intended to be a full description. A full appreciation of the various aspects of the embodiments disclosed herein can be gained by taking into consideration the entire specification, claims, drawings, and abstract as a whole.

Embodiments of the invention include a system for transferring driving control of a moving vehicle from a first driver station to a second driver station. The system comprises a platform manager (PLM) to confirm that parking brake settings are the same at the first driver station and the second driver station and a transmission control module (TCM) for checking shutdown faults. The TCM can provide requirements (or conditions) that are necessary to complete the transfer between driver stations. Upon satisfying the requirements, the TCM can disable the first driver station and enable the second driver station. The requirements can include a maximum vehicle speed (e.g. 32 kph) and an absence of transmission shutdown faults.

A driver at the first driver station can utilize mechanical and electrical controls. A driver at the second driver station can use drive by wire technology to control the vehicle through an analog network. The system can include a third driver station that uses drive by wire technology to control the vehicle through a Controller Area Network (CAN). The system can also include a hydraulic brake that remains active at each of the first driver station, the second driver station and the third driver station. Further, the DbW system can be modified (e.g. by including additional hardware and components) to operate the vehicle using autonomous driving technology.

Embodiments of the invention also include a method of transferring control of a moving vehicle from a first driver station to a second driver station during mobile operation of the vehicle. The method can include the steps of (a) detecting a request for transfer, (b) confirming that a parking brake setting at the first driver station matches a parking brake setting at the second driver station and (c) upon satisfying requirements for transfer, disabling the first driver station and enabling the second driver station.

The requirements for transfer can comprise a maximum speed of the vehicle (e.g. 32 kph). The requirements can also comprise a confirmation of the absence of active transmission shutdown faults. The method can require that the second driver station is assigned a gear selection setting equal to a setting at the first driver station. An alert can be activated if the first driver station and the second driver station have different parking brake settings. The method can further comprise the step of transferring control of the moving vehicle from a first driver station to a third driver station (as well as from a second or third driver station to a first driver station). Further, the method can require confirmation from an operator at the first driver station for a transition between driver stations.

Introduction

A first aspect of the invention is a system for incorporating multiple driving stations in a vehicle, including a primary, secondary and tertiary station, each having full driving functionality.

A second aspect of the invention is a system that incorporates multiple driving stations that uses a hybrid DbW functionality (hydro-mechanical and electric) at the primary station and electric DbW functionality at secondary and tertiary stations.

A third aspect of the invention is a DbW system that incorporates hydro-mechanical braking and steering control at the primary station for added safety.

A fourth aspect of the invention is a DbW system that includes a transmission override switch for improved functionality and safety (to allow one to override the speed limit requirement).

A fifth aspect of the invention is a DbW system that includes an emergency brake (e-brake) valve at the secondary and tertiary driver stations for improved functionality and safety.

A sixth aspect of the invention is a DbW system that is adaptable for remote and/or autonomous driving.

A seventh aspect of the invention is a DbW system that includes a series of checks (i.e. standards or requirements) for a transition between driver stations.

An eighth aspect of the invention is a DbW system that includes a method of switching driver stations requiring that park brake controls at the stations have the same setting.

A ninth aspect of the invention is a DbW system that includes a method of switching driver stations requiring a check of transmission (TX) shutdown faults.

A tenth aspect of the invention is a DbW system that includes a method of switching driver stations that has speed parameters and/or a maximum speed requirement.

An eleventh aspect of the invention is a DbW system that includes a method of switching control from a first driver station to a second driver station, wherein the second driver station adopts the gear position of a first driver station.

A twelfth aspect of the invention is a steering system for multiple driver stations wherein a first station uses hybrid (hydro-mechanical and electrical) steering and secondary/tertiary stations use electric steering.

A thirteenth aspect of the invention is a system that utilizes multiple subsystems or modules (i.e. steering module, gear selection module and brake modules) for incorporating multiple driver stations in a vehicle, each having full driving functionality.

BRIEF DESCRIPTION OF FIGURES

The drawings described herein are for illustrative purposes only of selected embodiments and not all possible implementations, and are not intended to limit the scope of the present disclosure.

The summary above, as well as the following detailed description of illustrative embodiments, is better understood when read in conjunction with the appended drawings. For the purpose of illustrating the disclosure, exemplary constructions of the disclosure are shown in the drawings. However, the disclosure is not limited to specific methods and instrumentalities disclosed herein. Moreover, the drawings are not to scale.

NUMERICAL REFERENCE FEATURES

Figure 1:
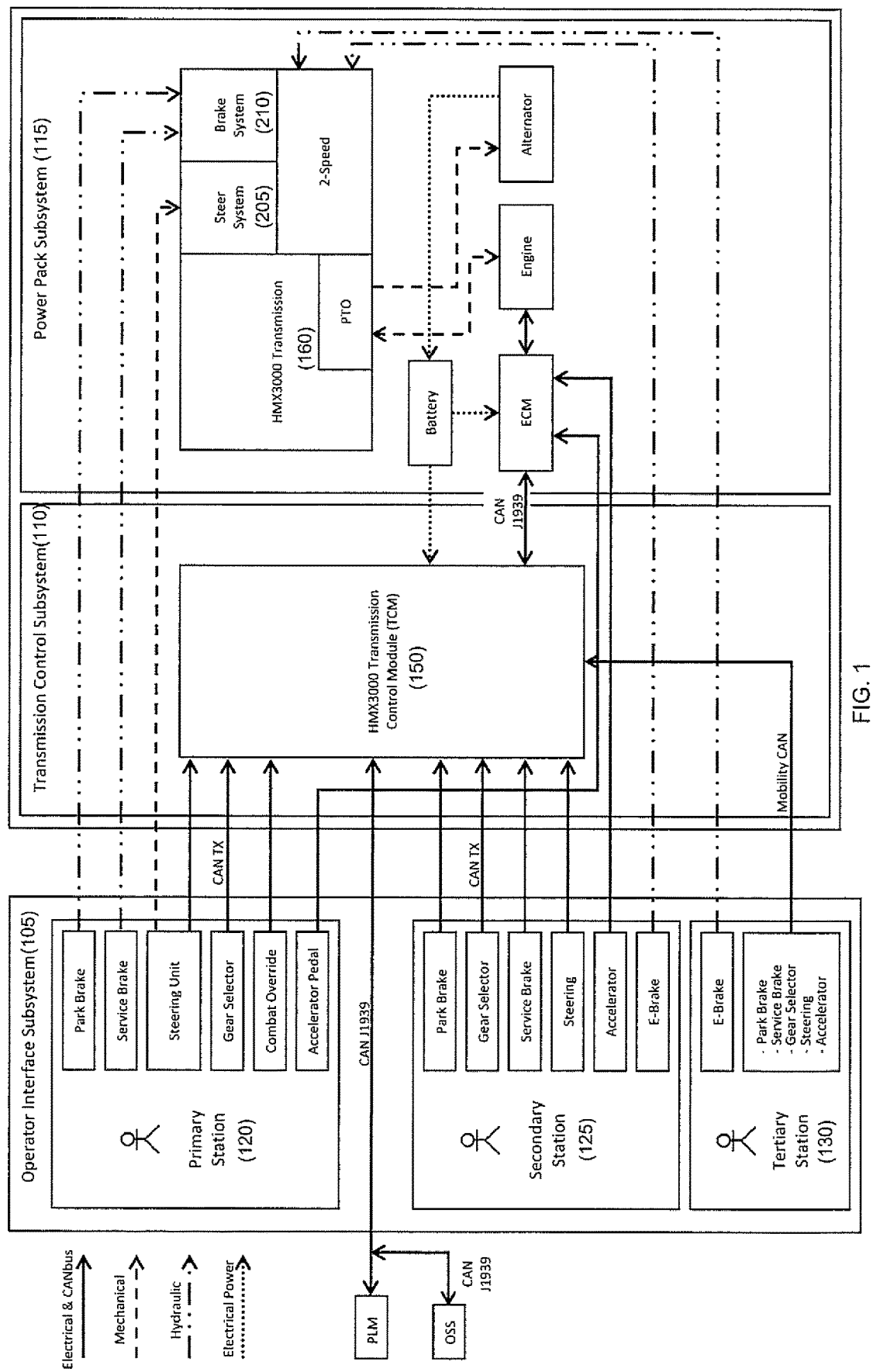
FIG. 1 depicts an overview of the control system in relation to the vehicle controls, according to one aspect of the invention.

The following list of index numbers and associated features is intended for ease of reference to FIG. 1 through FIG. 14 and illustrative embodiments of the present disclosure:
105—Operator Interface Subsystem
110—Transmission Control Subsystem
115—Power Pack Subsystem
120—Primary Driver Station
125—Secondary Driver Station
130—Tertiary Driver Station
150—Transmission Control Module (TCM)
160—Transmission
205—Steering System
210—Braking System
215—Gear Selection System
220—Accelerator System
250—Engine
300—Control Panel for Secondary and Tertiary Stations
400—Push Button Gear Selector for Primary and Secondary Stations
500—Steering Block Control Diagram (all systems)
510—Steer Control Subsystem
515—Hydraulic Steer Subsystem
520—Transmission Output
600—Primary Station Steering System
605—Steering Yoke (primary station)
610—Steering Input Sensor ($1^{st}$)

615—Steering Input Sensor ($2^{nd}$)
620—Hydro-Mechanical Steering Unit
625—Steering Pump Displacement Control Unit
630—Steering Pump Displacement Sensor
635—Steering Pump
640—Steering Motor
645—Electro-hydraulic Control Valve ($1^{st}$)
650—Electro-hydraulic Control Valve ($2^{nd}$)
700—Secondary Station Steering System
705—Steering Yoke (secondary station)
800—Tertiary Station Steering System
805—Steering Yoke (tertiary station)
900—Braking Control Block Diagram (all systems)
910—Brake Control Subsystem
915—Hydraulic Brake Subsystem
920—Electro-Hydraulic Valve for Braking (Service Brake)
925—Service Brake Pressure Sensor
930—Electro-Hydraulic Valve for Braking (Park Brake)
935—Park Brake Pressure Sensor
950—Brake Assembly
960—Braking Control System for Secondary Station
965—Accelerator Input Subsystem
970—Braking Control System for Tertiary Station
975—Engine Control Module (ECM)
980—Accelerator Control Block Diagram
985—Engine Output

DETAILED DESCRIPTION OF THE INVENTION

Definitions

While the invention is primarily described for the use in military track vehicles, it is understood that the invention is not so limited and can be used with other vehicles. Other applications include, for example, using the invention in wheeled vehicles such as utility vehicles and tractor trailer vehicles. The invention can also be used in autonomous vehicles, for example, to allow operation to be switched between manual (human driven) and autonomous (computer driven).

Reference in this specification to "one embodiment/aspect" or "an embodiment/aspect" means that a particular feature, structure, or characteristic described in connection with the embodiment/aspect is included in at least one embodiment/aspect of the disclosure. The use of the phrase "in one embodiment/aspect" or "in another embodiment/aspect" in various places in the specification are not necessarily all referring to the same embodiment/aspect, nor are separate or alternative embodiments/aspects mutually exclusive of other embodiments/aspects. Moreover, various features are described which may be exhibited by some embodiments/aspects and not by others. Similarly, various requirements are described which may be requirements for some embodiments/aspects but not other embodiments/aspects. Embodiment and aspect can be in certain instances be used interchangeably.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Directional and/or relational terms such as, but not limited to, left, right, nadir, apex, top, bottom, vertical, horizontal, back, front, and lateral are relative to each other, are dependent on the specific orientation of an applicable element or article, are used accordingly to aid in the description of the various embodiments in this specification and the appended claims, and are not necessarily intended to be construed as limiting.

As applicable, the terms "about" or "generally", as used herein in the specification and appended claims, and unless otherwise indicated, means a margin of +/−20%. Also, as applicable, the term "substantially" as used herein in the specification and appended claims, unless otherwise indicated, means a margin of +/−10%. It is to be appreciated that not all uses of the above terms are quantifiable such that the referenced ranges can be applied.

The term "analog" or "analog signal" refers to any continuous signal for which the time varying feature (variable) of the signal is a representation of some other time varying quantity (i.e. analogous to another time varying signal).

The term "brake by wire" refers to a braking system wherein brakes are actuated by the energizing of a solenoid control valve to send hydraulic pressure to brake actuators to activate the brakes of a vehicle. In conventional systems, braking effort is usually the result of building hydraulic pressure in the brake lines.

The term "controller" refers to a comparative device that receives an input signal from a measured process variable, compares this value with that of a predetermined control point value (set point), and determines the appropriate amount of output signal required by the final control element to provide corrective action within a control loop. An electronic controller uses electrical signals and digital algorithms to perform its receptive, comparative and corrective functions.

The term "Controller Area Network," "CAN" or "CAN-bus" refers to a vehicle bus standard designed to allow microcontrollers and devices to communicate with each other in applications without a host computer.

The term "driver station" or "driving station" refers to a position wherein a person (i.e. driver) can control mobility of a vehicle. It includes controls/inputs for steering, braking, gear selection and acceleration.

The term "park brake" refers to a brake that can be used for stopping a vehicle in the event of failure of the main (i.e. service) brakes and to keep the vehicle from moving when parked.

The term "park by wire" refers to a system wherein a park brake is actuated by energizing of a solenoid control valve to bleed the hydraulic pressure from the park brake actuator to activate the park brake (spring applied hydraulic released).

The term "platform manager" or "PLM" refers to the controller that initiates the station transfer only if all the pre-requisites are met.

The term "shift by wire refers to a system that directs motion of a vehicle (forward, reverse) by commanding actuators inside the transmission through electronic commands based on the input from the driver (reverse, neutral or drive).

The term "steer by wire" refers to a system that provides steering control of a car with fewer mechanical components/linkages between the steering wheel and the wheels. The control of the wheels' direction is established through electric motor(s) that are actuated by electronic control units monitoring the steering wheel inputs from the driver. In a track vehicle, steering is achieved by electronically varying the speeds of the left and right outputs.

The term "steering unit" refers to a collection of components used to steer a vehicle. In a track vehicle, the steering unit varies the speeds of the left and right outputs for steering.

The term "throttle by wire" refers to a system that propels a vehicle by means of an electronic throttle without any cables from the accelerator pedal to the throttle valve of the engine. In electric vehicles, this system controls the electric motors by sensing the accelerator pedal input and sending commands to the power inverter modules.

The term "track vehicle" or "full-track vehicle" refers to a vehicle such as a tank that is supported, driven and steered by a tank/caterpillar tread.

The term "voting strategy" refers to a comparison of electrical input signals (steering and braking) for validity of the driver's input, wherein if two out of three signals disagree, the system will flag a fault.

Other technical terms used herein have their ordinary meaning in the art that they are used, as exemplified by a variety of technical dictionaries. The particular values and configurations discussed in these non-limiting examples can be varied and are cited merely to illustrate at least one embodiment and are not intended to limit the scope thereof.

Description of Preferred Embodiments

Embodiments of the invention include a system for multiple driving stations in a vehicle that utilizes hybrid DbW functionality (i.e. hydro-mechanical and electric control) at a primary station and full DbW functionality (i.e. electric control) at secondary and tertiary stations. The system can utilize redundant components for the DbW functions to maintain a high level of safety and reliability. The system can also incorporate hydro-mechanical braking and steering control for the operator to bring the vehicle to a safe stop or to continue driving the vehicle at a safe degraded mode in the event of DbW failure (depending on the severity of DbW failure and the active control station). Further, the system can be fully upgradeable to a completely DbW system (electrically controlled) without mechanical backups.

Challenges to design and safety are present when including more than one set of driving controls in a vehicle. There is an obvious danger to any loss of control or delayed transfer of control between driver stations. Because of this, conventional designs typically require that a vehicle be stopped for transition between driver stations. Further, both drivers must participate in the transition. This can be impractical or unsafe for military vehicles. For example, in a combat situation, a driver station can be damaged or a primary driver can become incapacitated due to injury. The system described herein allows a transition between driver stations while the vehicle is moving, through a station selector switch.

FIG. 1 depicts an overview of a preferred design of the control system in relation to the vehicle controls, according to one aspect of the invention. The system includes an Operator Interface Subsystem 105, a Transmission Control Subsystem 110 and a Power Pack Subsystem 115. Electrical and Controller Area Network (CAN) connections are depicted by solid arrows. Mechanical (dashed arrows), hydraulic (dashed-dot arrows) and electrical power (dotted) connections are also depicted.

From the primary station 120, a driver operates a park brake and service brake through hydraulic connections. The steering unit can be operated by mechanical or electrical connections (i.e. hybrid control). The gear selector, combat override and accelerator pedal operate by electrical connections.

From the secondary station 125, a driver operates the vehicle through drive by wire (DbW) technology. Operation of the vehicle is achieved through electrical connections. However, an E-brake (emergency brake) is operated by hydraulic connections. Similarly, a driver at the tertiary station 130 operates the vehicle through electrical connections. However, an E-brake (emergency brake) is operated by hydraulic connections.

Components of the drive train area are also depicted. In a preferred design, the drive train includes an HMX3000 Transmission Control Module (TCM) 150 that operates an HMX3000 Transmission 160. Other components include a steer system 205, brake system 210 and engine 250. The organization of these components and others (e.g. alternator, battery and ECM) in relation to the drive sprockets/tank treads is common to other track vehicles and known to those skilled in the art.

Figure 2:
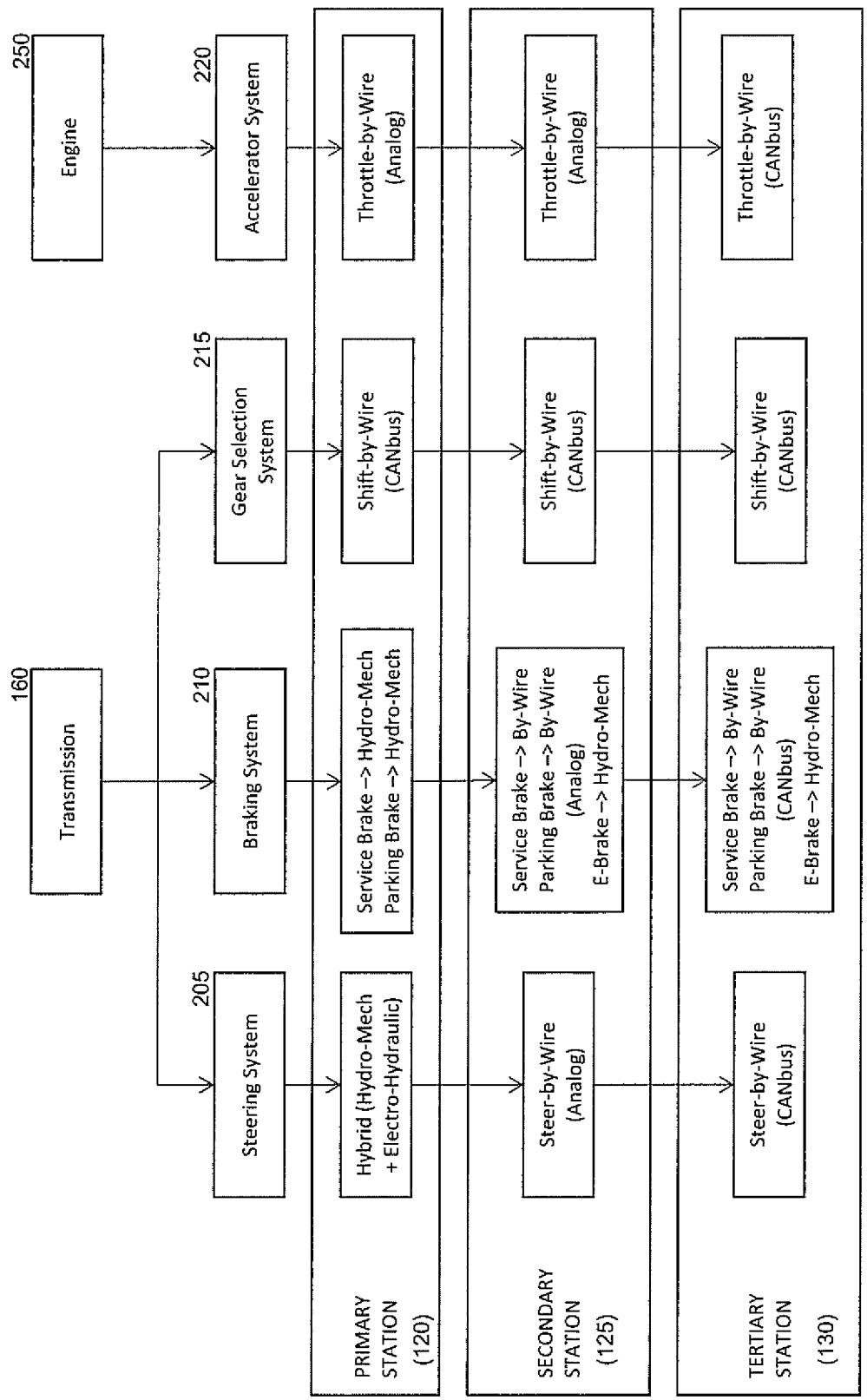
FIG. 2 depicts an overview of the "power pack" DbW control system, according to one aspect of the invention.

FIG. 2 depicts an overview of the "power pack" DbW control system, according to one aspect of the invention. The control system includes the transmission and engine. It can be further described according to four subsystems:

Steering System (205)
Braking System (210)
Gear Selection System (215)
Accelerator System (220)

The various DbW subsystems in the control system can interface between the primary, secondary and tertiary stations to the Transmission Control Module (TCM) and Transmission (for gear selection, steering and braking functions) as well as to the Engine Control Module (ECM) and Engine.

From the primary station 120, a driver operates the steering unit 205 by mechanical or electrical connections (i.e. hybrid control). A braking system 210 (i.e. parking brake and service brake) is operated through hydraulic (i.e. hydro-mechanical) connections. The gear selector 215 is operated by electrical (CAN) connections. An accelerator system 220 (i.e. throttle by wire) is operated by analog electrical connections.

From the secondary station 125, a driver operates the steering unit 205 by electronic (i.e. steer by wire) analog connections. Operation of the braking system 210 is also through analog electrical connections. The E-brake (emergency brake) is operated by hydraulic (hydro-mechanical) connections. The gear selector 215 (i.e. gear shifting/shift by wire) is electronic through CAN connections. An accelerator system 220 (i.e. throttle by wire) is operated by analog electrical connections.

From the tertiary station 130, a driver operates the steering unit 205 by electronic (i.e. steer by wire) CAN connections. Operation of the braking system 210 is also through CAN connections. However, an E-brake (emergency brake) is operated by hydraulic connections. Gear shifting 215 (i.e. shift by wire) and the accelerator system 220 (i.e. throttle by wire) are electronic through CAN connections.

As described, the vehicle can be driven by any of three control stations:

Primary Station (120)

Secondary Station (125)

Tertiary Station (130)

In a preferred design, an Operator Station Selector (OSS) toggle switch is used to designate driving duties to a control station. An operator uses the OSS toggle switch to initiate a transfer between driver stations. As described further below, the system can include criteria/requirements for a transition between stations.

Figure 3:
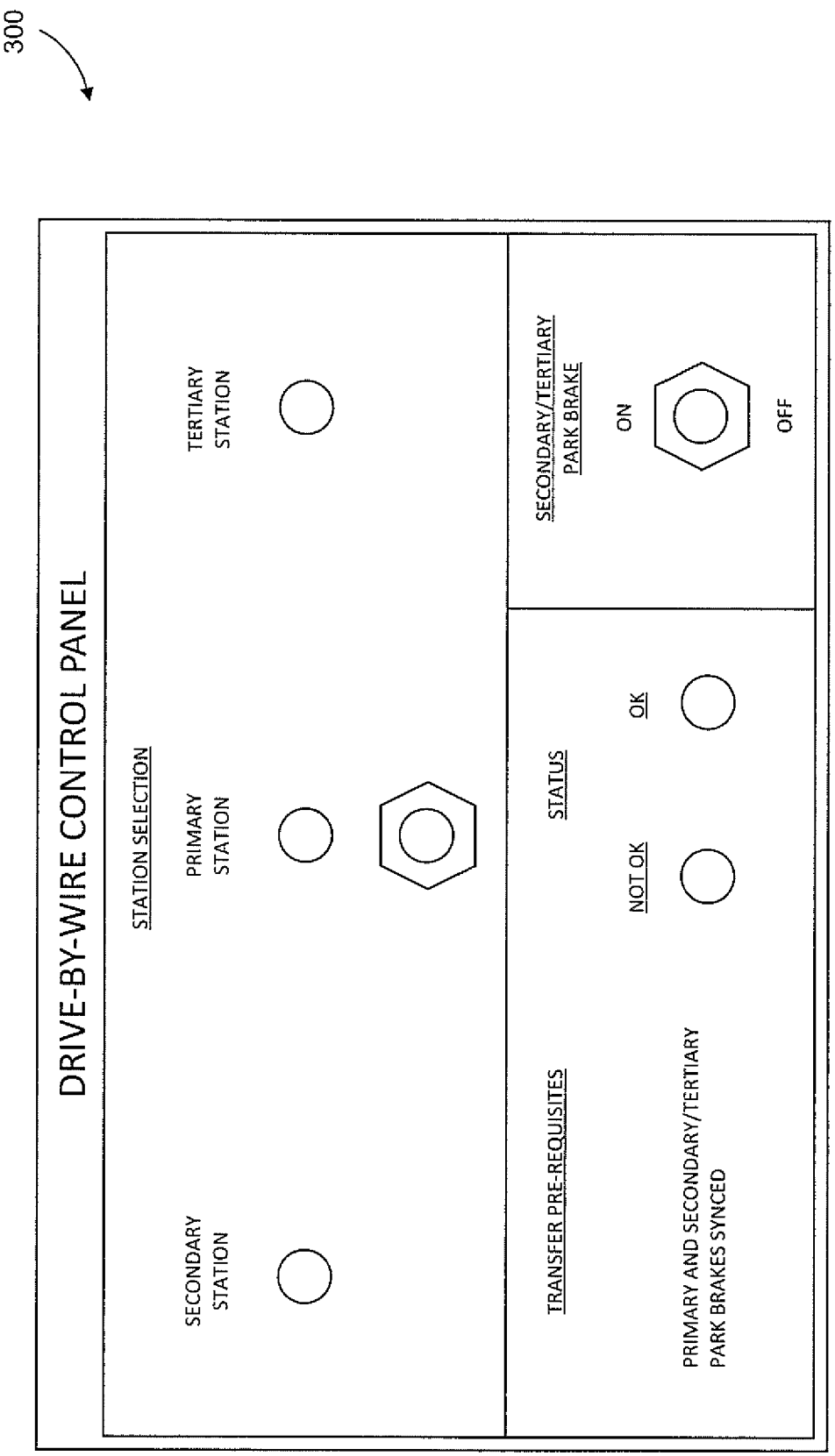
FIG. 3 depicts the DbW control panel, according to one aspect of the invention.

FIG. 3 depicts a design for a control panel 300 for the secondary and tertiary stations. The system has three settings: Primary Station Position, Secondary Station Position and Tertiary Station Position. To switch controls between the primary, secondary and tertiary stations, an operator toggles the Operator Station Selector (OSS) toggle switch. The control panel can include park brake controls. The control panel can also include indicator lights to provide feedback on transfer pre-requisites and confirmation that brakes are synced.

During normal operation, the primary station 120 is the default "active driver station" when the system (i.e. the track vehicle) is powered up. The primary station operator has full mobility control of the vehicle. The secondary and tertiary station operators will assume default roles and control (e.g. navigation, dispatch and/or weapon systems).

To transfer mobility operations from the primary station 120, the toggle switch is shifted to the "Secondary Station" position. This directs an operator at the secondary station 125 to take over mobility control of the vehicle. The primary and tertiary station operators' control functions (except the primary station operator's park and service brakes) will be disabled. The secondary station default role and control (e.g. weapon system) will also be disabled.

Similarly, when the "Tertiary Station" position is activated, the operator at the tertiary station 130 can take over the mobility control of the vehicle. The primary and secondary station operators' control functions (except the primary station operator's park and service brakes) will be disabled. The tertiary station default role and control (e.g. a weapon system) will also be disabled. Each station and its capabilities is described in greater detail below.

Primary Station

In a preferred design, the primary station 120 includes the following components:
Steering Yoke (mechanically connected to the steering input position sensors and hydro-mechanical steering unit)
Push-button Gear Selector (common for both primary and secondary stations)
Accelerator Pedal
Hydro-Mechanical Service Brake Pedal
Hydro-Mechanical Park Brake Actuator Secondary Station The operator at the secondary station 125 can take over the mobility control (i.e. driving) of the vehicle when conditions are satisfied. The system can include a speed requirement for transition between driver stations. If the vehicle is travelling above this speed, the system will not allow a transition between driver stations. In a preferred design, the maximum speed of the vehicle is limited to 32 kph during DbW mobility due to safety and practicality considerations. However, a higher or lower speed can be used. For example, a speed between 10 kph and 80 kph can be used.

In a preferred design, the secondary station includes the following components that provide analogue outputs to the transmission control module (TCM) and engine control module (ECM):
Multi-Function Control Handle (MFCH) for steering, braking and acceleration
Push-button Gear Selector (common for both primary and secondary stations)
Electronic Service Brake Pedal (Optional)
Electronic Park Brake Switch
E-Brake Valve (for actuating the park brake in the event of an emergency—preferably installed in a location that is accessible to both secondary and tertiary station operators)
Operator Station Selector Switch (for switching of vehicle mobility control—preferably installed in a location that is accessible to both secondary and tertiary station operators)

Tertiary Station

Similarly, an operator at the tertiary station 130 can take over the mobility control of the vehicle when conditions are satisfied (e.g. maximum speed limited to 32 kph). The station can include the following components that broadcast CAN messages (on a dedicated CAN network) to the TCM and ECM:
Multi-Function Control Handle (MFCH) for steering, braking and acceleration
Electronic Park Brake Actuator
Electronic Service Brake Pedal (Optional)
Gear Selector
E-Brake Valve (for actuating the park brake in the event of an emergency—preferably installed in a location that is accessible to both secondary and tertiary station operators)
Operator Station Selector Switch (for switching of vehicle mobility control—preferably installed in a location that is accessible to both secondary and tertiary station operators).

Mobility Control Functions

The system can utilize a transmission control module (TCM) 150 with a HMX-3000 transmission 160 or similar design. The primary function of the TCM 150 is to effectively manage and control the vehicle direction, gear ratio and steering function of the transmission. Through communication with the engine control module (ECM) and user interfaces, the TCM 150 determines the appropriate gear ratio to produce optimum performance and drivability at the engine's operating condition. It can continuously monitor and control the electro-hydraulic steering system and have the ability to reconfigure the control system if a fault is detected. It can include self-diagnostic capabilities and the ability to warn the operator of any faults in the transmission system during startup or during mobility operation.

Figure 4:
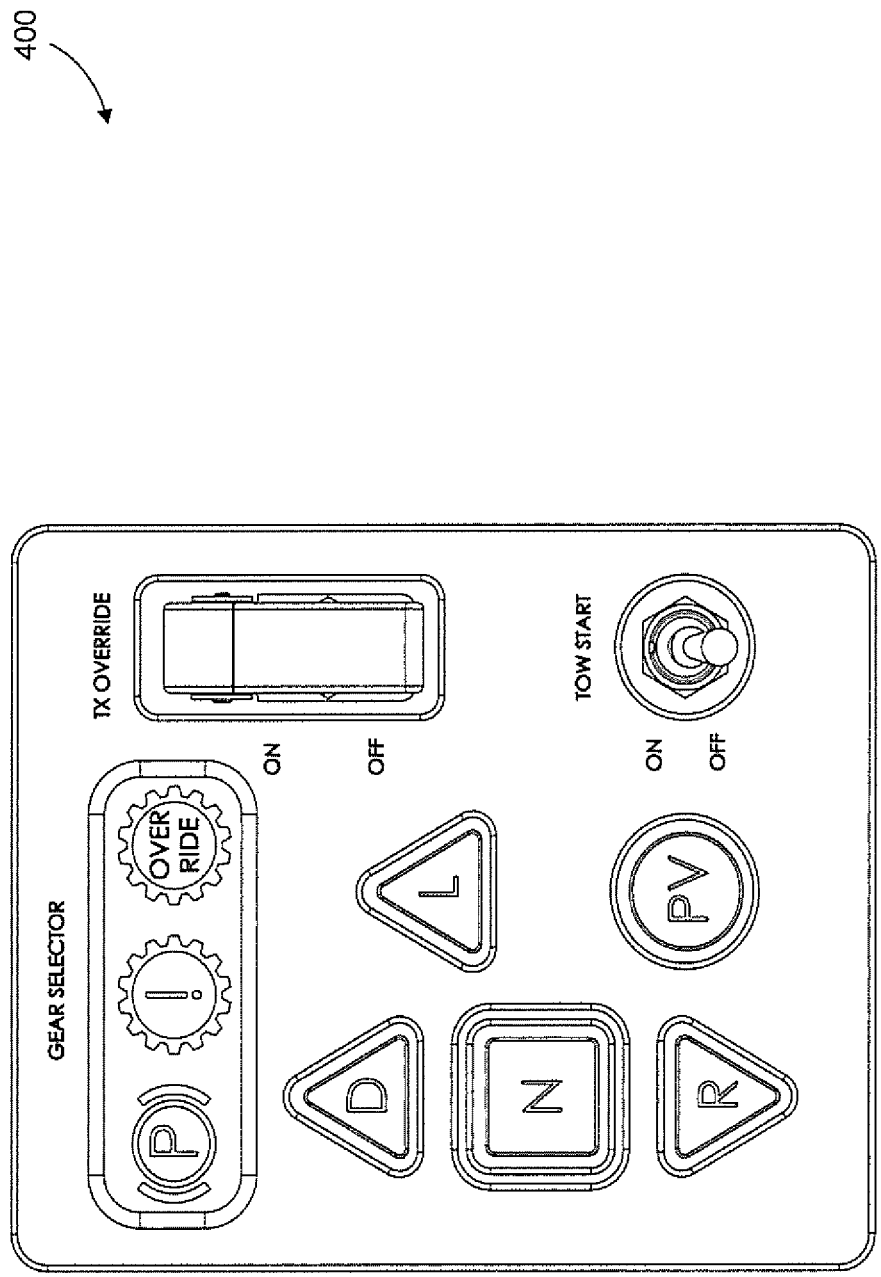
FIG. 4 depicts the push-button gear selector for the primary and secondary stations, according to one aspect of the invention.

FIG. 4 depicts a preferred design for a push-button gear selector 400 for primary and secondary stations. During driving operations, the operator (at either the primary 120, secondary 125 or tertiary station 130) determines vehicle direction and operating speed by the use of the gear selector and accelerator input respectively. The gear selector assembly for the primary and secondary stations can include five momentary switches as shown that transmit the operator's desired gear selection signal to the TCM 150. The gear selector for the Tertiary Station can be configured (e.g. rotary switch, individual push buttons etc.) based on the space available at that station.

Drive mode can activate the forward synchro and the low-speed clutch. To increase the transmission ratio, the TCM 150 can increase the hydraulic pumps' displacement until it reaches full displacement then reduce the hydraulic motors' displacement until it reaches zero. When the upshift speed (dynamic value) is reached in low range, the low-speed clutch will be disengaged. The speed of the drive motors is then decreased to match the high range gear ratio and the high range clutch is activated. The vehicle then increases speed as long as the accelerator pedal is continuously depressed. When the vehicle decelerates, this process is reversed, shifting to low range at a speed lower than that of the up-shift speed.

Neutral mode decouples the engine from the transmission by disengaging the direction synchro and clutches. Reverse mode will activate the reverse synchro and the low range clutch. Reverse direction is limited to low range operation only unless the override switch is toggled. Low range operates similar to drive mode with vehicle speed limited to the maximum low range speed (e.g. 20 kph). The TCM 150 will not allow the transmission to shift to high range in this mode. Pivot mode of operation allows the vehicle to rotate around its central axis by counter rotating its tracks. The speed of counter rotation is based on engine speed (accelerator position) and steering yoke angle.

Override Switch

An override switch provides the operator the ability to overcome the speed limits imposed on the transmission by the control software. To prevent operator abuse, the override switch can be lead-sealed and event logged by the TCM 150. The override function can be configured to be reset when the engine is cut off or when the vehicle master switch is toggled.

Steer Control Function

Figure 5:
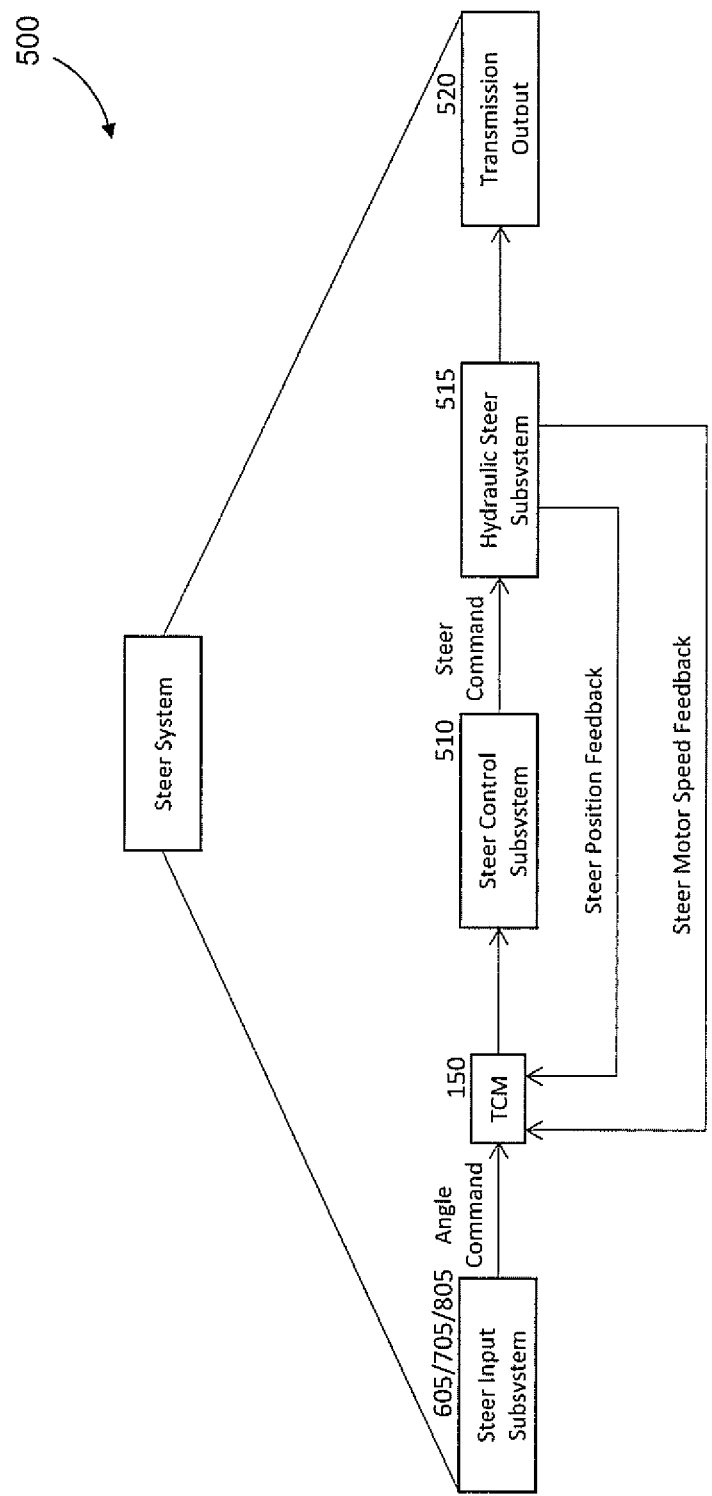
FIG. 5 is a block diagram of the steering control system, according to one aspect of the invention.

A track vehicle is steered by coordinated rotation of the left and right tread. FIG. 5 depicts the overall steering control block diagram for all stations 500. Steering is achieved through a series of subsystems. Through angle command (from a steering yoke 605/705/805 or other control), the TCM 150 ultimately steers the vehicle through transmission output. A steer control subsystem 510 is linked to a hydraulic steer subsystem 515. The hydraulic steer subsystem 515 gives steer position feedback and steer motor speed feedback to the TCM.

Each driver station includes a steering control system. The steering control system can include the following input components:
    Primary Station Steering Yoke
    Secondary Station Multi-Function Control Handle (MFCH)
    Tertiary Station Multi-Function Control Handle (MFCH)
The primary station operator turns the steering yoke connected to a Hydro-Mechanical Steering Unit (HMSU) and rotary sensors to steer the vehicle. The secondary and tertiary station operators can also have the capability to steer the vehicle using a MFCH with analog rotary sensors and a MFCH with CAN outputs respectively.

Figure 6:
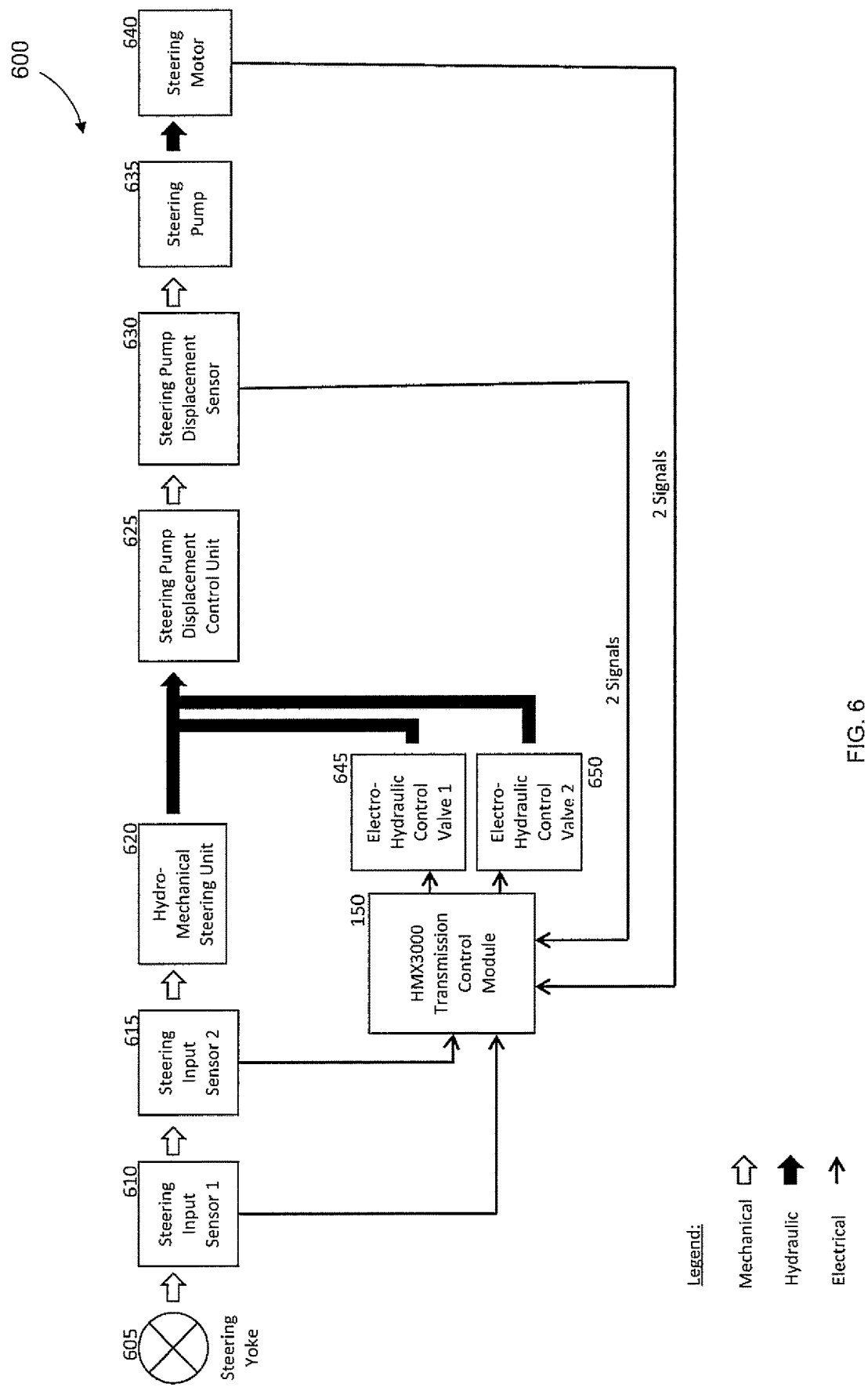
FIG. 6 depicts the primary station steering control system, according to one aspect of the invention.

FIG. 6 depicts the primary station steering control system 600. Mechanical connections between components are depicted as hollow arrows. Hydraulic connections between components are depicted as solid arrows. Similarly electrical connections between components are depicted as thin (line) arrows.

The primary station steering system 600 utilizes a hybrid steering control system where steering is achieved via hydro-mechanical input to the transmission and electrical input to the TCM 150 operating in parallel. The steering yoke 605 is mechanically linked to four non-contacting hall-effect rotary sensors housed in two separate sensor assemblies (610, 615). The signals from these sensors are interpreted by the TCM 150 as steer input from the primary station operator and a voting strategy can be used to determine the validity of all inputs. The steering pump displacement control unit 625 controls the steering pump 635 which in turn causes the steering motor 640 to rotate and vary the speeds of the left and right outputs. The resultant steer readings from the pump displacement sensor 630 and steering motor speed 640 are fed back to the TCM 150 by electronic connections.

The hydro-mechanical steering unit (HMSU) 620 is also mechanically linked to the steering yoke 605 to retain the same dependability of a conventional hydro-mechanical steering system. When the primary station operator actuates the steering yoke, the HMSU will supply 100% of the control flow to the steering pump displacement control pistons. The rotary sensors within the respective sensor assemblies (610, 615) will simultaneously send the corresponding signals to the TCM 150 to provide accurate and reliable steering pump displacement control. This is to ensure that in the event of mechanical failure of the steering yoke 605 or HMSU 620 or DbW (electrical) failure, steering control will still be available.

The TCM is electrically connected to electrohydraulic control valves (645, 650). Steering can be controlled via a closed loop feedback system. This is to ensure that the respective displacement of the steering pump 635 is maintained during a steer for any given steer input from the steering yoke at a given vehicle speed.

Secondary Station Steering Control System

Figure 7:
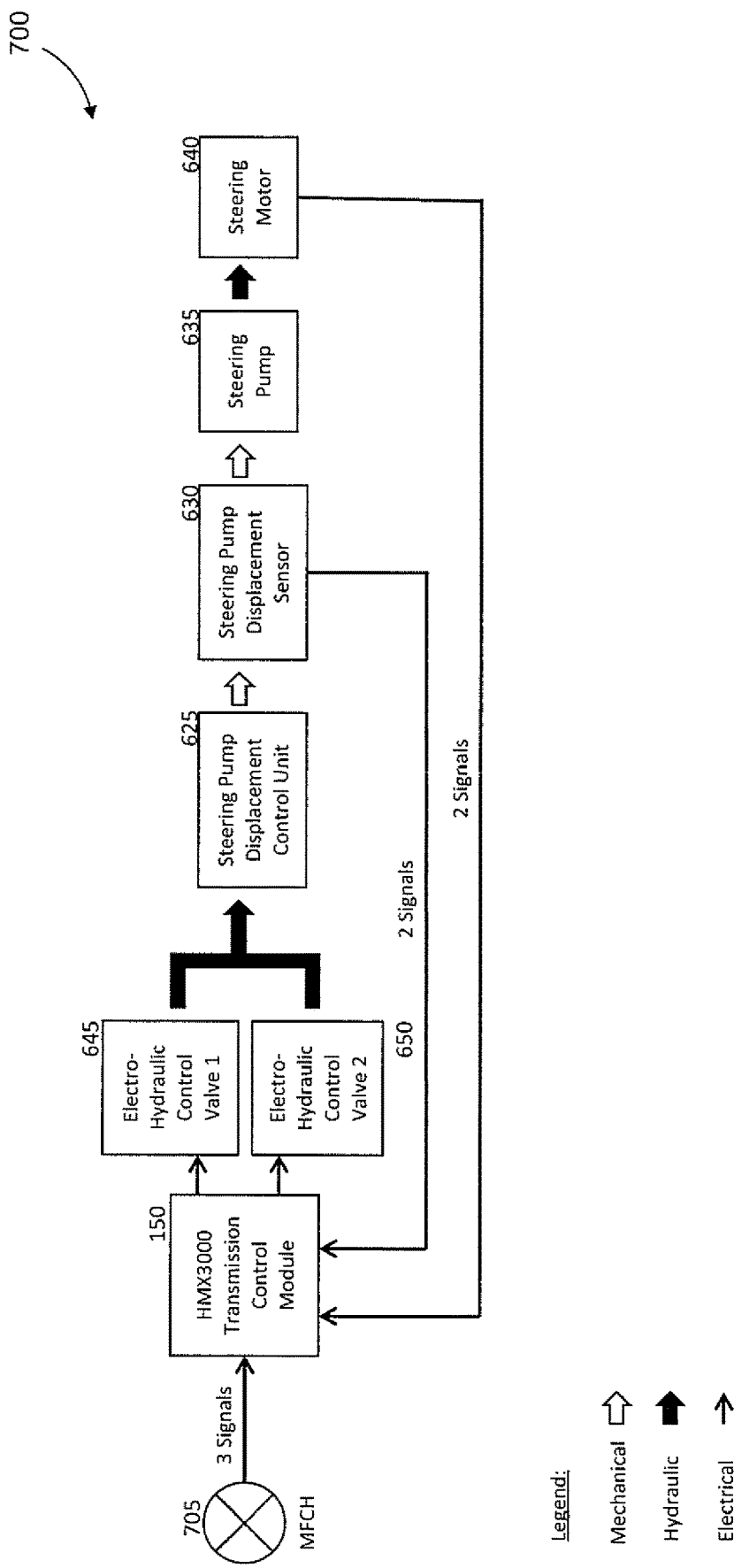
FIG. 7 depicts the secondary station steering control system, according to one aspect of the invention.

FIG. 7 depicts the secondary station steering control system 700. Mechanical connections, hydraulic and electrical connections between components are depicted as in FIG. 6 (hollow arrows, solid arrows and thin arrows respectively).

The operator at the secondary station 125 can steer the vehicle with a Multifunction Control Handle ("MFCH") 705. Similar to the primary station operator, when the secondary station operator actuates the MFCH 705, position sensors within the MFCH send corresponding signals to the TCM 150. For redundancy, there are three independent position sensors built into the MFCH. A voting strategy can be used in determining the validity of all inputs. The TCM will perform its operational functions and output command signals to the two steering pump control valves.

The TCM 150 has electrical connections to two electro-hydraulic control valves (645, 650) that are hydraulically connected to a steering pump displacement control unit 625. The steering pump displacement control unit 625 controls the steering pump 635 which in turn causes the steering motor 640 to rotate and vary the speeds of the left and right outputs. The resultant steer readings from the pump displacement sensor 630 and steering motor speed 640 are fed back to the TCM 150 by electronic connections.

Tertiary Station Steering Control System

Figure 8:
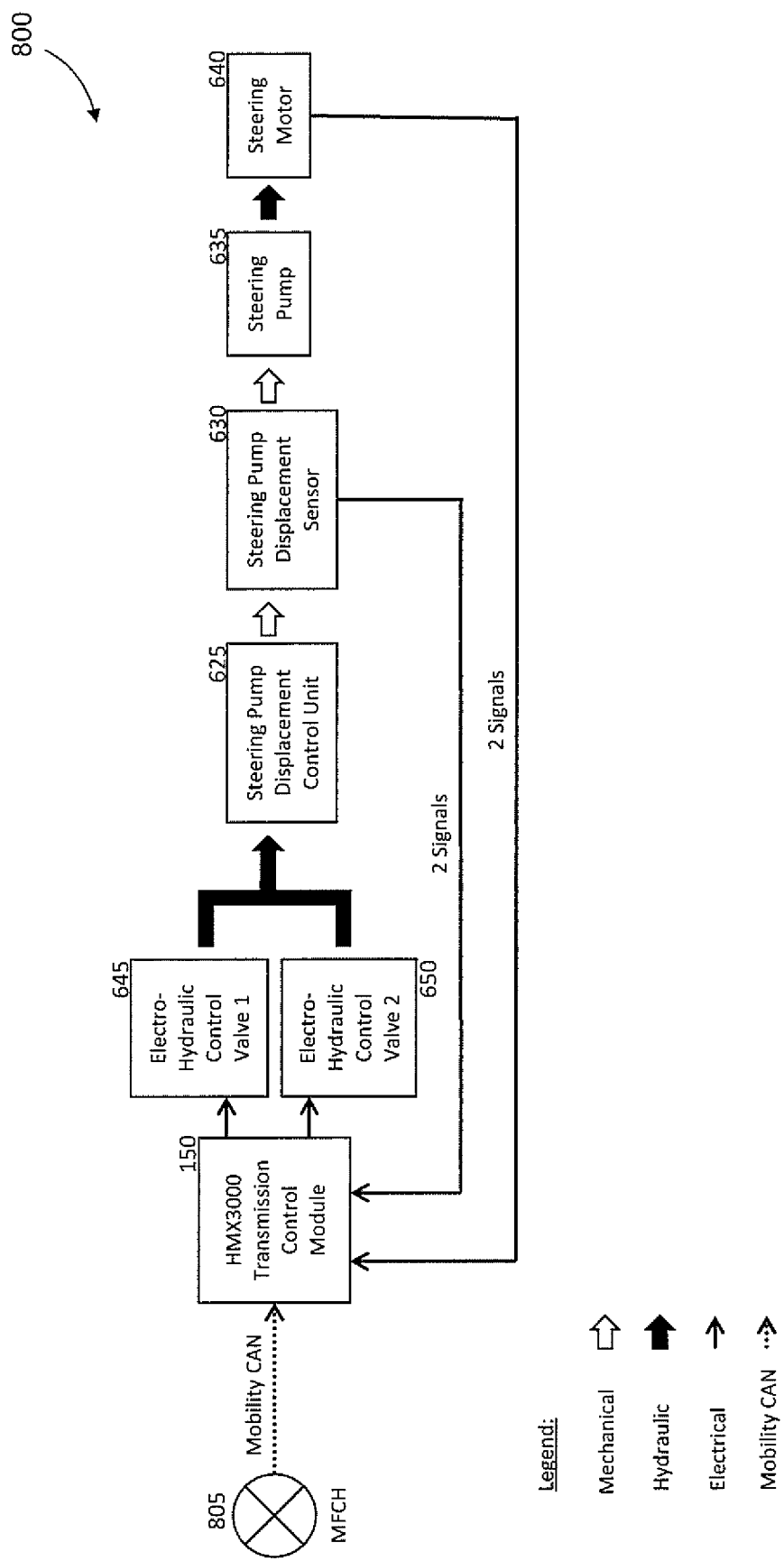
FIG. 8 depicts the tertiary station steering control system, according to one aspect of the invention.

FIG. 8 depicts the Tertiary Station Steering Control 800. Mechanical connections, hydraulic and electrical connections between components are depicted as in FIG. 6 and FIG. 7. Mobility CAN connections are depicted as dotted arrows.

The operator at the tertiary station 130 has steering capabilities using an MFCH 805 at the tertiary station. However, when the tertiary station operator actuates the MFCH 805, CAN messages instead of analog signals are broadcast to the TCM 150. The TCM 150 will perform its operational functions and output command signals to the two steering pump control valves. The components depicted in FIG. 8 operate in the same manner as those depicted in FIG. 6 and FIG. 7.

Brake Control Function

Figure 9:
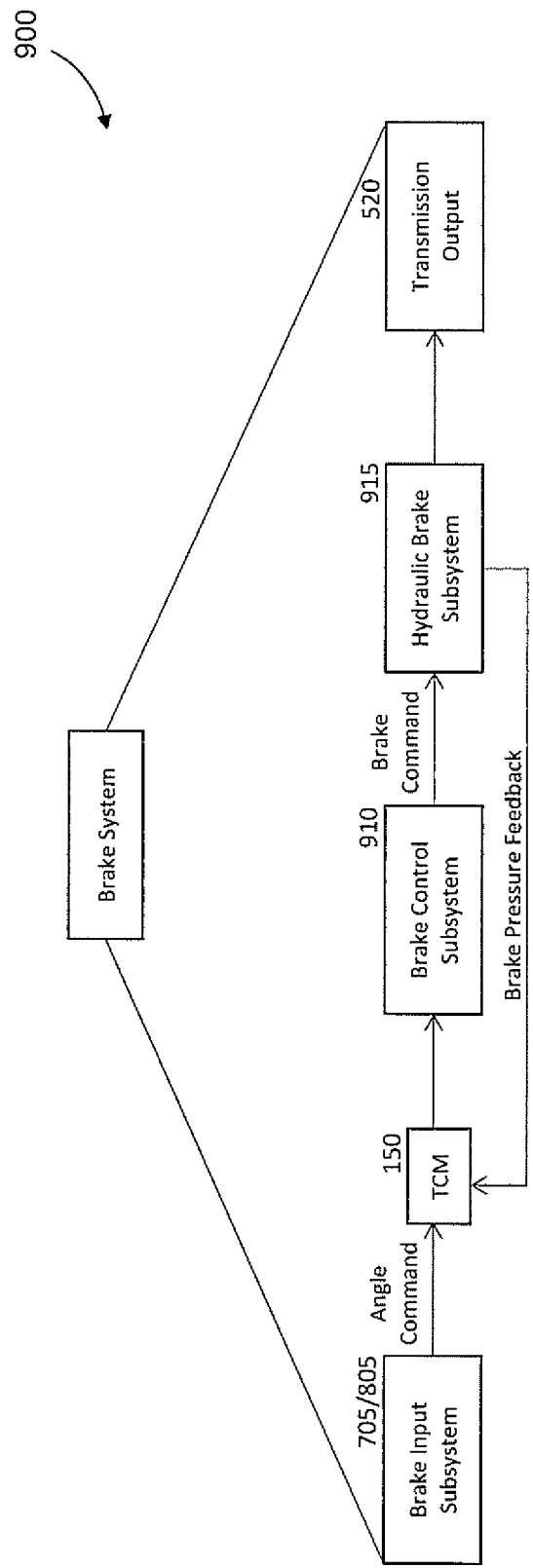
FIG. 9 is a block diagram of the secondary and tertiary braking control stations, according to one aspect of the invention.

As the primary station brake control system is fully hydro-mechanical, it is common in the art and not discussed in detail herein. FIG. 9 depicts an overall braking control block diagram 900 for the secondary and tertiary stations. Through angle command from a MFCH (705, 805), the TCM 150 ultimately controls the brakes through transmission output 520. The hydraulic brake subsystem 915 gives brake pressure feedback to the driver. The brake control subsystem 910 is also depicted.

The secondary and tertiary station brake control system can include the following input components:
- Secondary Station Multi-Function Control Handle
- Secondary Station Electronic Service Brake Pedal (Optional)
- Secondary Station Electronic Park Brake Switch
- Tertiary Station Multi-Function Control Handle
- Tertiary Station Electronic Service Brake Pedal (Optional)
- Tertiary Station Electronic Park Brake Switch
- Hydraulic E-Brake Button (preferably installed in a location that is accessible to both secondary and tertiary station operators)

In a preferred design, the secondary station operator pulls back on the MFCH 705 or depresses the electronic service brake pedal with analog rotary sensors to apply the service brake. To engage/disengage the park brake, a toggle switch is toggled to send a digital signal to the TCM 150. The brake control inputs from the tertiary station are similar except that CAN messages are broadcast to the TCM 150 to control the application of the service and park brakes.

Figure 10:
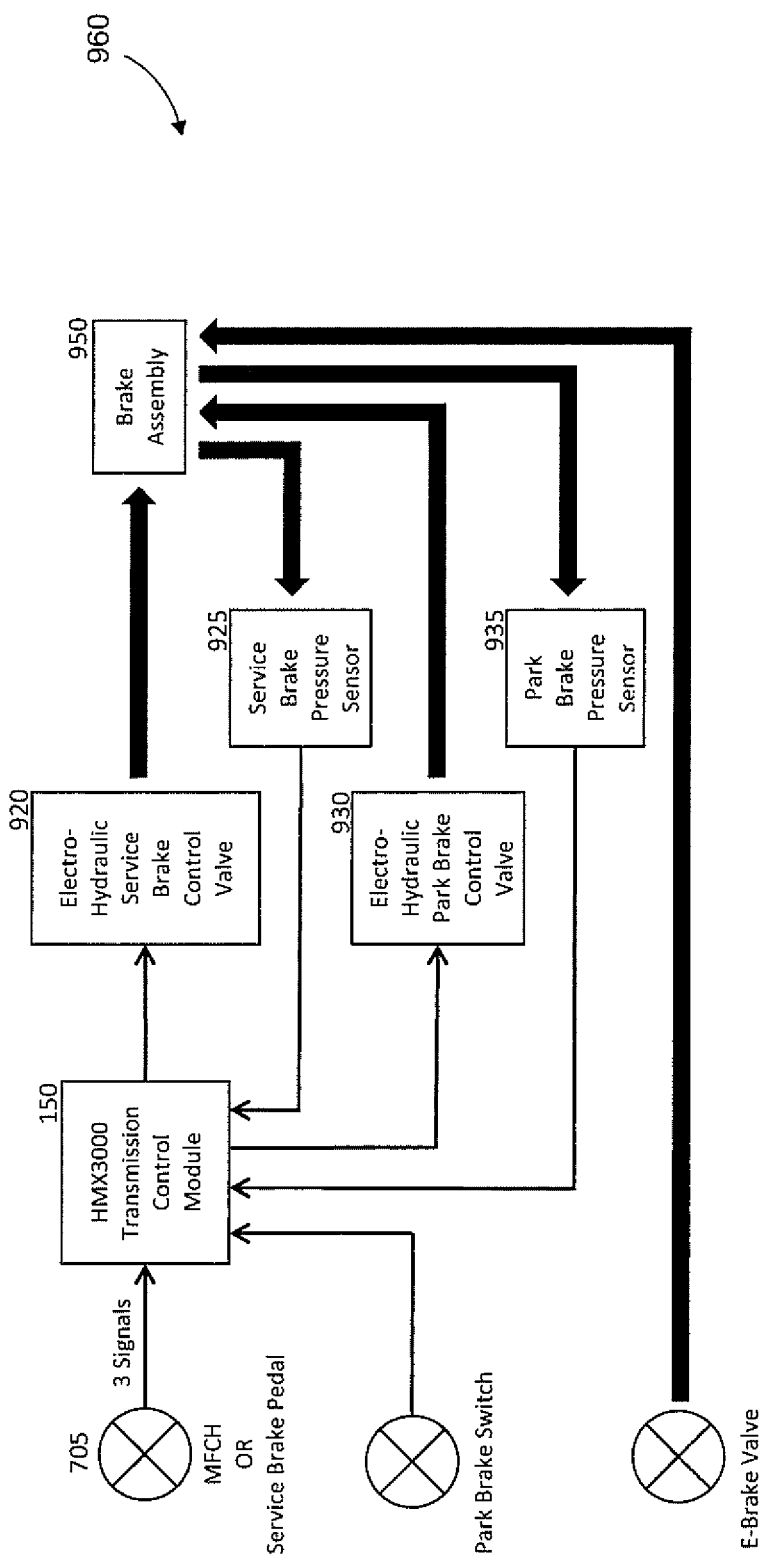
FIG. 10 depicts the secondary station braking control system, according to one aspect of the invention.

FIG. 10 depicts the braking control system for the secondary station 960. The secondary station 125 is equipped with a MFCH 705 or electronic service brake pedal and park brake switch to decelerate and maintain the vehicle in a stationary position. The service brake can be actuated by the MFCH 705 or electronic brake pedal that provides analog signals from the position sensors to the TCM 150 to control the proportional hydraulic valves (920, 930) for braking 950. For redundancy, there are three independent position sensors built into the MFCH or electronic service brake pedal and a voting strategy is used to determine the validity of all inputs.

The parking brake can be actuated by a park brake toggle switch, located on the DbW Control Panel 300 that energizes or de-energizes the park brake solenoid valve to apply or release the vehicle park brake. To ensure a fail-safe design, there is also a hydro-mechanical e-brake valve located in a location accessible to the secondary station operator to actuate the park brake in the event of an emergency independent of the DbW system.

Feedback from the brake assembly 950 to the TCM 150 is also depicted. This is achieved through hydraulic connections to the service brake pressure sensor 925 and park brake pressure sensor 935. These sensors have electrical connections to the TCM 150.

Figure 11:
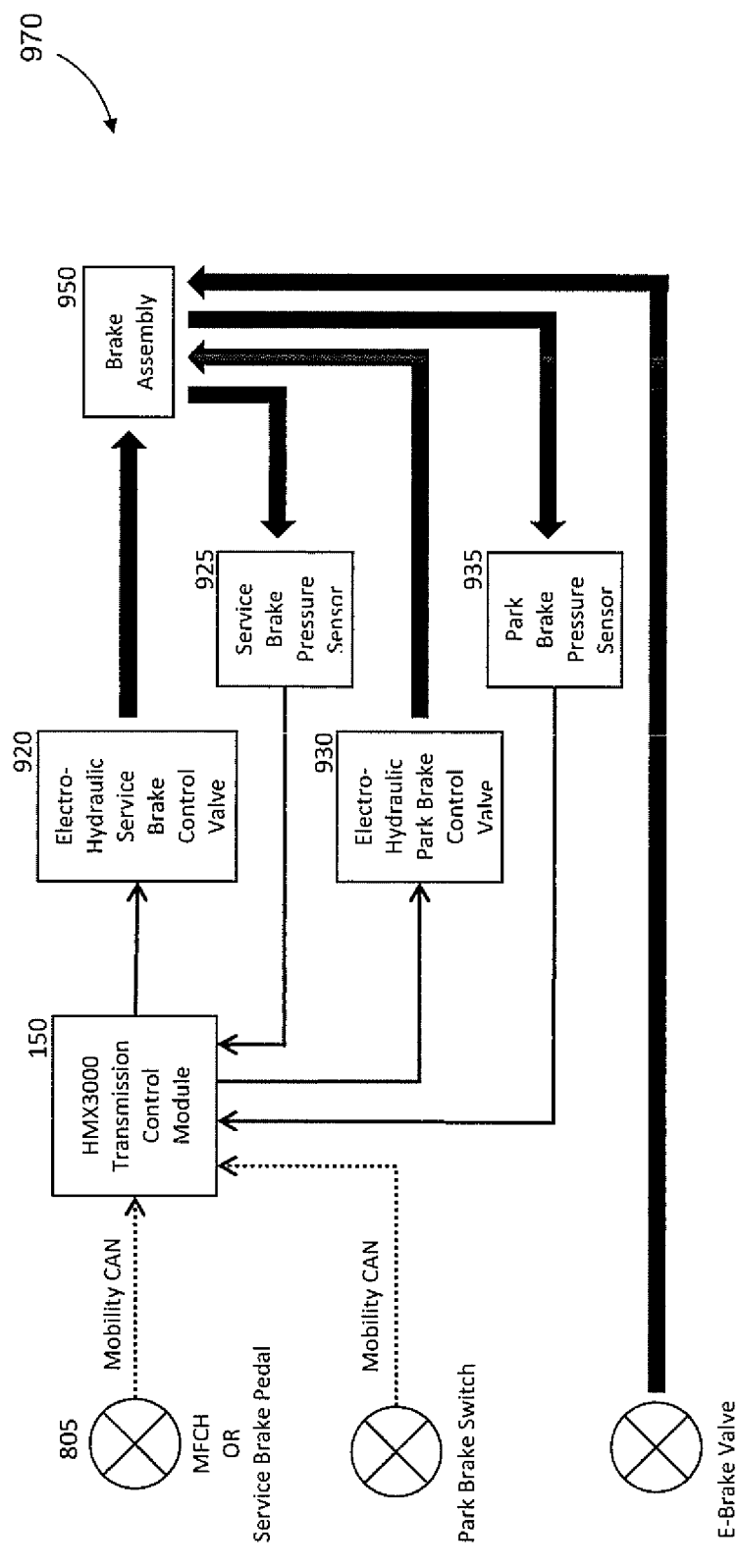
FIG. 11 depicts the tertiary station braking control system, according to one aspect of the invention.

FIG. 11 depicts the braking control system for the tertiary station 970. The tertiary station operator is also equipped with a MFCH 805 or electronic service brake pedal and park brake switch to decelerate and maintain the vehicle in a stationary position. Similarly, the service brake will be actuated by the MFCH 805 or electronic brake pedal. However, CAN messages instead of analog signals, are broadcast to the TCM. The TCM 150 will perform its operational functions and output command signals to the service brake control valves for braking.

The parking brake is also actuated by a park brake toggle switch, which can be located on the Drive-by-Wire Control Panel 300 or another location within the tertiary station if the spot on the control panel is taken up by the secondary station park brake. As with the service brake, CAN messages instead of a digital signal will be broadcast to the TCM to energize or de-energize the park brake solenoid valve to apply or release the vehicle park brake.

The hydro-mechanical e-brake valve can be common between both secondary and tertiary stations. The tertiary station uses CAN connections (rather than analog connections) between the controls and the TCM.

Figure 12:
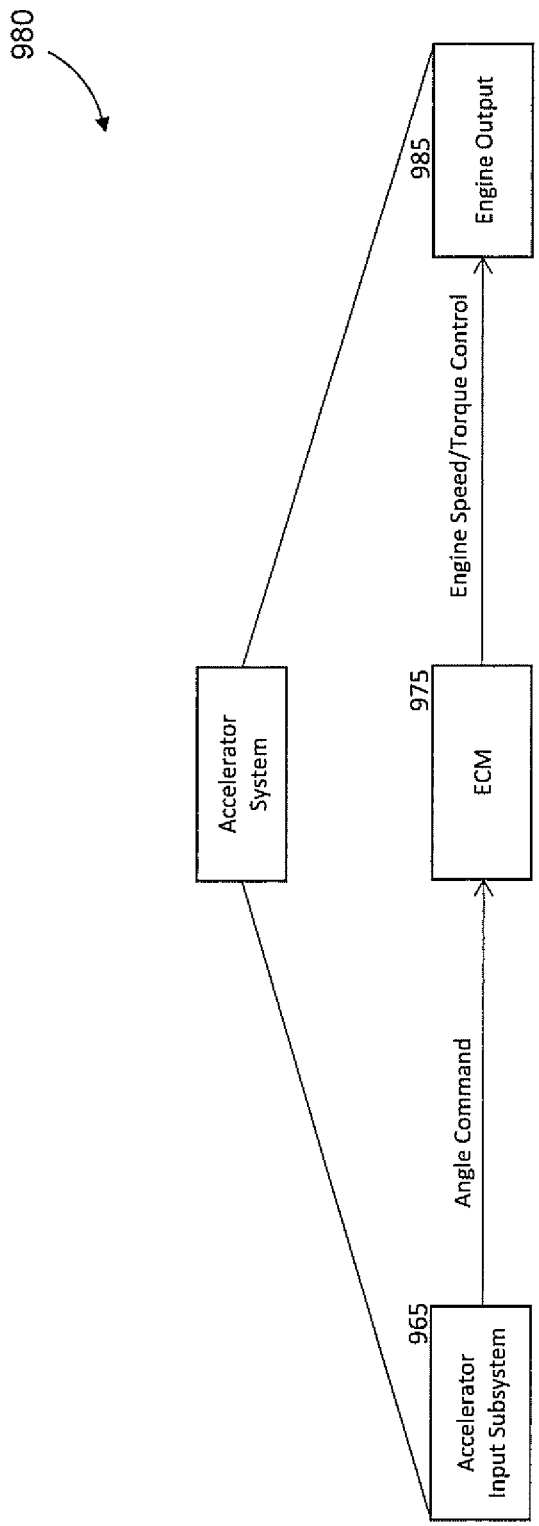
FIG. 12 is a block diagram of the accelerator control system, according to one aspect of the invention.

FIG. 12 depicts the overall accelerator control block diagram 980 for all stations. The accelerator control system (i.e. accelerator input subsystem) 965 includes the following input components:
- Primary Station Accelerator Pedal
- Secondary Station Multi-Function Control Handle (MFCH)
- Tertiary Station Multi-Function Control Handle (MFCH)

The primary station operator depresses the accelerator pedal with an analog sensor to control the speed of the vehicle via engine output 985. The secondary and tertiary station operators are also capable of controlling the speed of the vehicle using a MFCH with an analog rotary sensor and a MFCH with CAN outputs respectively.

As the engine control module (ECM) 975 is an off-the-shelf (OTS) controller that comes with the engine, details of the control strategy for the accelerator inputs are common in the art and are not be discussed in this document.

Control Strategy

In this system, operators at the primary station 120, secondary station 125 and tertiary station 130 are capable of driving the vehicle. The primary station operator is the default operator (whenever the vehicle is powered up) for driving and the secondary or tertiary station operators can take over the driving control by switching the OSS toggle switch. A set of conditions can be established for the transferring of controls between the various control stations to ensure that the transition is done in a smooth and safe manner.

Listed below are a preferred set of conditions necessary for transfer of driving control function from the primary station 120 to the secondary station 125 or tertiary station 130:

The secondary OR tertiary station operator takes over by switching the OSS toggle switch to 'Secondary Station' or 'Tertiary Station' respectively (see FIG. 3)

The Platform Manager (PLM) checks that both the primary station AND secondary OR tertiary station park brake states are the SAME (either BOTH park brakes are 'ON' or BOTH park brakes are 'OFF') before sending the CAN message to the TCM to initiate the transfer The TCM 150 checks that there are no active transmission (TX) shutdown faults (including secondary and tertiary station specific shutdown faults but excluding primary station specific shutdown faults)

Upon transfer, the primary station's 120 control function for steering, acceleration and gear selection will be completely disabled. The secondary station 125 OR tertiary station 130 operator will assume full control of the vehicle mobility The secondary OR tertiary station accelerator pedal will be functional only if the vehicle speed is 32 kph or less (if speeds are more than 32 kph, the Transmission auto-decelerates to 32 kph).

The secondary OR tertiary station gear selector will be at the primary station's last known gear position.

Vehicle steering will correspond to the steering angle of the MFCH at the point of transfer.

The secondary OR tertiary station's default role and control will be completely disabled as well.

It is important to note that the primary station 120 park brake and service brake will remain functional (regardless of which operating station is active) as they are hydro-mechanical. Information will be displayed to the respective station operator's showing the status of the vehicle controls. Further, the operators at the secondary station 125 and tertiary station 130 have the ability to override the 32 kph speed limit requirement. This allows the secondary OR tertiary station operators to drive the vehicle above this speed if needed for an extenuating circumstance.

Transfer of driving control function from the secondary station 125 or tertiary station 130 to the primary station 120 is similar to the transfer from the primary station 120 to the secondary station 125 or tertiary station 130 except that there is an additional step by the primary station operator to acknowledge the handover of control from the secondary or tertiary station operator before the process is completed.

Listed below are a preferred set of conditions necessary for switching control functions from the secondary station 125 or tertiary station 130 to the primary station 120:

The secondary OR tertiary station operator hands over by driving responsibilities by switching the OSS toggle switch to 'Primary Station' (see FIG. 3).

The Platform Manager (PLM) will check that both the primary station AND secondary OR tertiary station park brake states are the SAME (either BOTH park brakes are 'ON' or BOTH park brakes are 'OFF') before sending the CAN message to the TCM 150 to initiate the transfer.

The TCM 150 will check that there are no active TX shutdown faults (including primary station specific shutdown faults but excluding secondary OR tertiary station specific shutdown faults).

Upon transfer, the TCM will enable the primary station Gear Selector input. The Gear Selector buttons will light up and flash to signal handover to the primary station operator. The primary station operator must acknowledge that he/she is taking over by depressing any button on the flashing gear selector pad (as a safety measure).

Upon acknowledgement, the secondary OR tertiary station control functions for steering, acceleration, braking (service and park brakes) and gear selection are disabled. The primary station operator will assume full control of the vehicle mobility.

The primary station gear selector will be at the secondary OR tertiary station's last known gear position.

Vehicle steering will correspond to the steering angle of the steering yoke at the point of transfer.

Working Example

Operation of Track Vehicle with Multiple Driver Stations

The system is well suited for use in a military vehicle such as a tank. In addition to driving capabilities, each driving station can include access to a navigation system, a communication system and/or a weapon system. In this example, the operator of a second station ("commander") takes over operation (i.e. driving duties) of a tank. The operator at the first station ("driver") relinquishes control to operate the turret on the track vehicle while the tank is moving. All operations (e.g. driving, navigation, weapons etc.) can continue during the transfer process. There will not be a need to stop the vehicle or stop other actions during the transfer.

In a combat situation, requiring a vehicle to stop can endanger the crew and/or jeopardize a mission. Hence, a quick and reliable system for transferring operation of the vehicle among drivers (while moving) is critical.

In a typical scenario, the commander will instruct another person to relinquish control and/or take over as the driver of the tank. The driver slows the vehicle speed to 32 kph or less, if necessary. He/she can confirm settings with others in the tank before initiating the transfer of driving duties. The steps for transition are depicted in FIG. 13.

Figure 13:
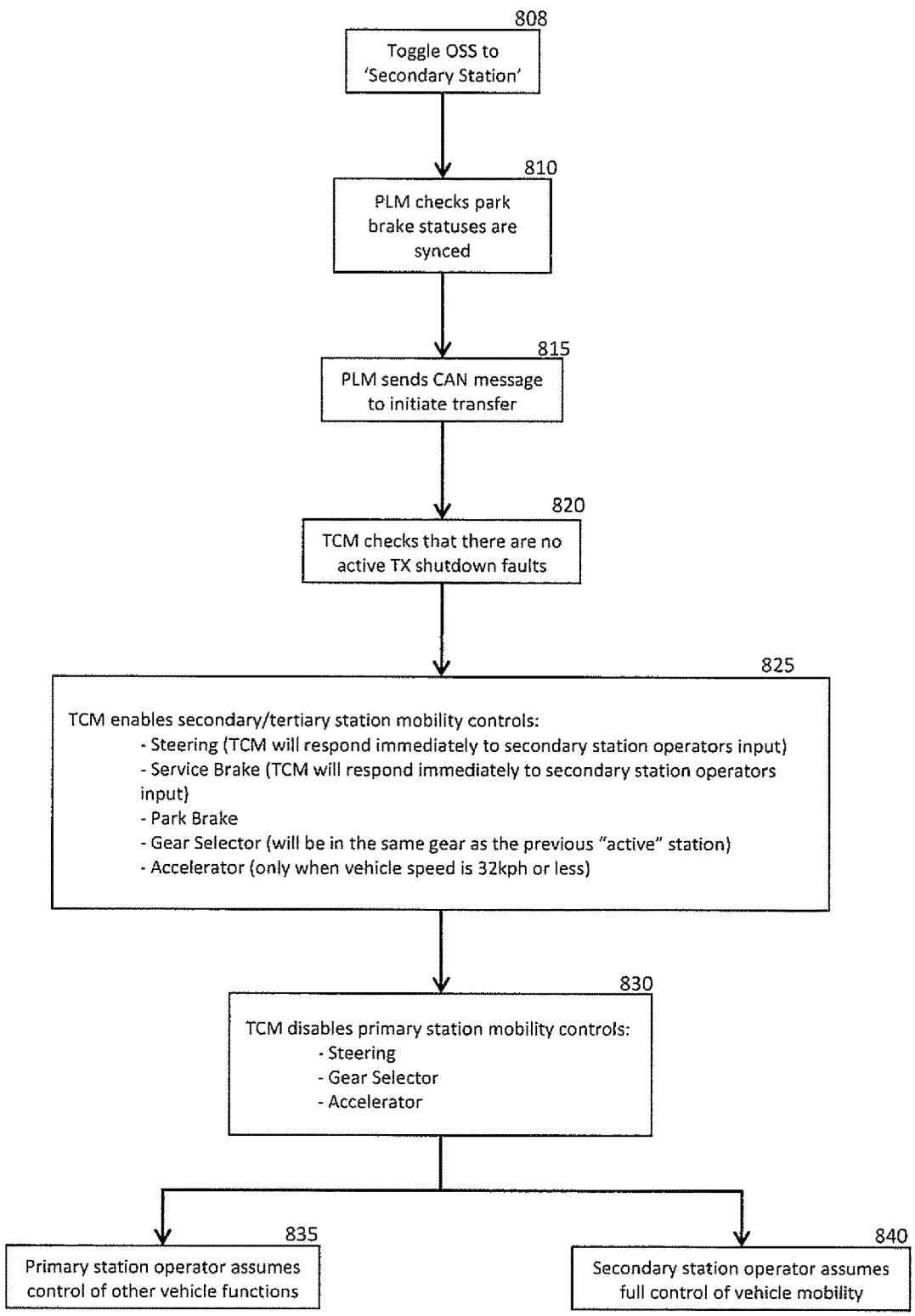
FIG. 13 is a flowchart of the steps involved in transferring control of a vehicle from a first driver station to a secondary driver station, according to one aspect of the invention.

Referring to FIG. 13, the commander initiates a request for transfer by switching the Operator Station Selector (OSS) toggle switch to 'Secondary Station' 808. The system will detect the request for transfer of mobility control from the first driver station to the second or third driver station. Upon satisfying requirements for transfer (described below) the first driver station is disabled the second (or third) driver station is enabled.

The Platform Manager (PLM) will check that park brakes of the primary station and secondary are the same (e.g. both park brakes are in 'OFF' position) 810 before sending the CAN message to the TCM to initiate the transfer 815. The TCM will then check for active transmission (TX) shutdown faults 820.

The TCM enables secondary/tertiary station mobility controls. This includes an action at each of the modules 825.

Steering (TCM will respond immediately to secondary station operators input)

Service Brake (TCM will respond immediately to secondary station operator's input)

Park Brake (must be synced for transfer)

Gear Selector (must be in the same gear as the previous "active" station)

Accelerator (transfer will proceed only when vehicle speed is 32 kph or less) The TCM disables the primary station mobility controls, including (1) the steering, (2) the gear selector and (3) the accelerator 830.

The system will confirm requirements before allowing a transition to occur. If the transfer requirements are not met, operators at the respective stations will continue with their respective roles. With this design, control for mobility and weapons will always be available. The system can activate an alert (e.g. flashing light and/or alarm) if one or more conditions/setting are preventing the transition.

The operator of the secondary station can assume control of vehicle mobility 840. The operator of the primary station can assume control of other vehicle functions 835. For example, he/she can focus on other duties such as weapons, logistics and/or navigation. The operator at the first station can operate the turret (or other weapon) while the tank is continuously driven.

In a similar procedure, the operator of a first station ("driver") can resume mobility operation (i.e. driving duties) of a tank. The operator at the second station ("commander") relinquishes driving duties. The steps for transition are depicted in FIG. 14.

Figure 14:
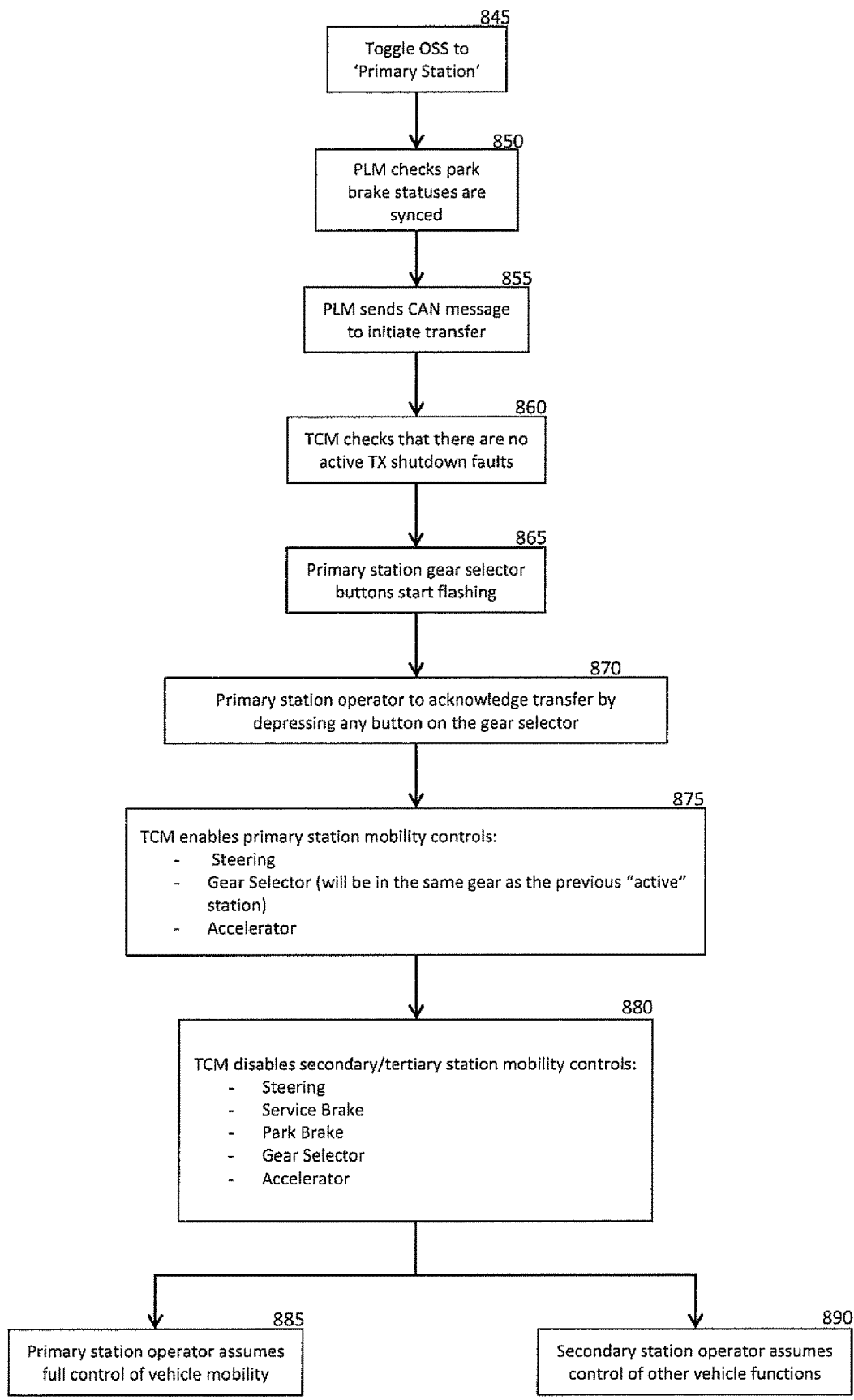
FIG. 14 is a flowchart of the steps involved in transferring control of a vehicle from a secondary driver station to a first driver station, according to one aspect of the invention.

Referring to FIG. 14, the commander relinquishes control by switching the Operator Station Selector (OSS) toggle switch to 'Secondary Station' 845. The Platform Manager (PLM) will check that park brakes of the primary station and secondary are the same (e.g. both park brakes are in 'OFF' position) 850 before sending the CAN message to the TCM to initiate the transfer 855. The TCM can then check for active transmission (TX) shutdown faults 860.

The primary station gear selector buttons will start flashing 865. The primary station operator must acknowledge transfer by depressing any button on the gear selector 870. The operator of a first station must acknowledge that controls are being transferred back. This ensures that he/she is aware of the transfer and avoids the potential of an unsafe condition where nobody is operating the vehicle.

The main reason for the confirmation is to ensure the operator who will be taking over drive control of the vehicle (who is not selecting the active station) is made aware of the transfer. In this example, it is the operator in the second driver station who initiates the transfer. Because he/she is potentially seated in a location out of arms reach or visual range of the operator at the first driver station, the operator at the first driver station may not be aware of the transfer. This safeguard prevents control of the drive function from being transferred to someone who is not ready to drive the vehicle.

The TCM enables the primary station mobility controls. This includes an action at each of the following modules 875.
Steering (TCM will respond immediately to secondary station operator's input)
Gear Selector (must be in the same gear as the previous "active" station)
Accelerator (transfer will proceed only when vehicle speed is 32 kph or less)

The TCM disables the secondary station mobility controls, including (1) the steering, (2) service brake, (3) park brake, (4) gear selector and (3) accelerator 880.

The operator of the primary station can assume control of vehicle mobility 885. The operator of the secondary station can assume control of other vehicle functions 890.

In an alternative design, driving control can be transferred to an autonomous control system (not shown). With this design, the transition process can begin when the commander initiates a request for transfer to autonomous control. The DbW system is well suited to autonomous control as mechanical controls and linkages are not required. The vehicle can use different techniques to detect surroundings, such as radar, laser light, GPS, odometry and computer vision for autonomous driving. Advanced control systems can interpret sensory information to identify appropriate navigation paths, as well as obstacles and signage. In the alternative, a remote control system can allow the vehicle to be driven through DbW from an operator at a remote station. This could allow remote operation of the vehicle from a command center.

Benefits of the hybrid DbW system design include:
It allows multiple stations to have driving capabilities. DbW provides the flexibility for the secondary or tertiary stations to have the capability of driving the vehicle. Driving function can be easily switched between the primary and secondary or tertiary stations and vice versa using the Operator Station Selector (OSS) toggle switch.
It allows easy adaptation for future development in remote and autonomous driving. The DbW system architecture provides the fundamental system structure for remote and autonomous driving.
It allows implementation of a DbW system without the safety concerns of DbW system failure as hydro-mechanical backup systems are in place.

It will be appreciated that variations of the above disclosed and other features and functions, or alternatives thereof, may be combined into other systems or applications. Also, various unforeseen or unanticipated alternatives, modifications, variations or improvements therein may be subsequently made by those skilled in the art which are also intended to be encompassed by the following claims.

Although embodiments of the current disclosure have been described comprehensively, in considerable detail to cover the possible aspects, those skilled in the art would recognize that other versions of the disclosure are also possible.

What is claimed is:

1. A system for transferring driving control of a moving vehicle from a first driver station to a second driver station, said system comprising:
a platform manager to confirm that parking brake settings are the same at the first driver station and the second driver station; and
a transmission control module for checking shutdown faults;
wherein said transmission control module provides requirements to complete the transfer, and
wherein said transmission control module disables the first driver station and enables the second driver station after the requirements are satisfied, and
wherein each of the first driver station and second driver station comprise manual controls for steering, braking, gear selection and acceleration,
wherein upon the transfer of driving control the first driver station's controls for steering, acceleration and gear selection are disabled and the control for braking remain functional.

2. The system of claim 1, wherein the requirements include a maximum vehicle speed and an absence of transmission shutdown faults.

3. The system of claim 2, wherein the maximum vehicle speed is 32 kilometers per hour.

4. The system of claim 1, wherein the second driver station comprises controls for a park brake, service brake and emergency brake, wherein at the second driver station steering, gear selection and acceleration is operated through electrical connections, wherein the park brake and service brake are operated through electrical connections and the emergency brake is operated through hydraulic connections.

5. The system of claim 1, wherein at the first driver station steering is operated through hydro-mechanical connections, braking is operated through hydraulic connections, gear selection is operated through electrical connections and acceleration is operated through electrical connections.

6. The system of claim 1, wherein the first driver station comprises a hydro-mechanical steering unit, and wherein the second driver station comprises a multifunctional control handle.

7. The system of claim 6, wherein the steering unit comprises a sensor assembly to send signals to the transmission control module and wherein the multifunctional control handle comprises position sensors to send signals to the transmission control module.

8. The system of claim 6, wherein at the point of during transfer the vehicle's steering will correspond to the steering angle of the multifunctional control handle and the gear selection at the second driver station will be at the same position as the first driver station.

9. The system of claim 1, wherein once requirements are satisfied for transfer a driver at the second driver station takes over mobility control of the vehicle from a driver at the first driver station.

10. The system of claim 1, wherein a driver at the second driver station uses drive by wire technology to control the vehicle through an analog network.

11. The system of claim 1, further comprising a third driver station.

12. The system of claim 11, wherein a driver at the third driver station uses drive by wire technology to control the vehicle through a Controller Area Network.

13. The system of claim 11, wherein a hydraulic brake remains active at each of the first driver station, the second driver station and the third driver station.

14. A method of transferring control of a moving vehicle from a first driver station to a second driver station during mobile operation of the vehicle, the method comprising the steps:
   initiating a request for transfer;
   confirming that a parking brake setting at the first driver station matches a parking brake setting at the second driver station; and
   upon satisfying requirements for transfer, disabling the first driver station and enabling the second driver station,
   wherein each of the first driver station and second driver station comprise manual controls for steering, braking, gear selection and acceleration,
   wherein upon the transfer of driving control the first driver station's controls for steering, acceleration and gear selection are disabled and the control for braking remain functional.

15. The method of claim 14, wherein an alert is activated if the first driver station and the second driver station have different parking brake settings.

16. The method of claim 14, wherein the requirements for transfer comprise a maximum speed of the vehicle.

17. The method of claim 16, wherein the maximum speed is 32 kilometers per hour.

18. The method of claim 14, wherein the requirements for transfer comprise a confirmation of the absence of active transmission shutdown faults.

19. The method of claim 14, wherein the second driver station is assigned a gear selection setting equal to a setting at the first driver station.

20. The method of claim 14, further comprising a step of transferring control of the moving vehicle from a first driver station to a third driver station.

21. The method of claim 20, further comprising a step of transferring control of the moving vehicle from a second or third driver station to a first driver station.

22. The method of claim 14, wherein the one or more requirements for transfer comprise a confirmation from an operator at the first driver station.

23. The method of claim 14, wherein the first driver station comprises a hydro-mechanical steering unit, and wherein the second driver station comprises a multifunctional control handle.

24. The method of claim 23, wherein the steering unit comprises a sensor assembly to send signals to the transmission control module and wherein the multifunctional control handle comprises position sensors to send signals to the transmission control module.

25. The method of claim 23, wherein at the point of during transfer the vehicle's steering will correspond to the steering angle of the multifunctional control handle and the gear selection at the second driver station will be at the same position as the first driver station.

26. The method of claim 14, wherein once requirements are satisfied for transfer a driver at the second driver station takes over mobility control of the vehicle from a driver at the first driver station.

27. The method of claim 14, wherein at the first driver station steering is operated through hydro-mechanical connections, braking is operated through hydraulic connections, gear selection is operated through electrical connections and acceleration is operated through electrical connections.

28. The method of claim 14, wherein the second driver station comprises controls for a park brake, service brake and emergency brake, wherein at the second driver station steering, gear selection and acceleration is operated through electrical connections, wherein the park brake and service brake are operated through electrical connections and the emergency brake is operated through hydraulic connections.

* * * * *